US008287353B2

(12) United States Patent
Meyer et al.

(10) Patent No.: US 8,287,353 B2
(45) Date of Patent: Oct. 16, 2012

(54) LOTTERY GAME METHOD

(75) Inventors: Mark G. Meyer, Zionsville, IN (US); Deborah Jonasson, Carmel, IN (US); Keith A. Jonasson, Carmel, IN (US); Arthur S. Robb, Hackensack, NJ (US)

(73) Assignee: Scientific Games International, Inc., Newark, DE (US)

( * ) Notice: Subject to any disclaimer, the term of this patent is extended or adjusted under 35 U.S.C. 154(b) by 886 days.

(21) Appl. No.: 10/612,307

(22) Filed: Jul. 2, 2003

(65) Prior Publication Data

US 2005/0003884 A1 Jan. 6, 2005

(51) Int. Cl.
*A63F 13/00* (2006.01)

(52) U.S. Cl. ........................................... 463/18; 463/17

(58) Field of Classification Search .............. 463/16–22, 463/25–28

See application file for complete search history.

(56) References Cited

U.S. PATENT DOCUMENTS 5,116,049 A * 5/1992 Sludikoff et al. ............. 273/139
5,979,894 A * 11/1999 Alexoff ......................... 273/139
6,497,408 B1 12/2002 Walker et al.
6,572,106 B2 * 6/2003 Alexoff ...................... 273/138.1
6,773,345 B2 8/2004 Walker et al.
2003/0050109 A1 * 3/2003 Caro et al. ...................... 463/17

OTHER PUBLICATIONS

"Powerball Odd & Prizes", & "How to play" Dated Dec. 2002 (www.powerball.com/pbprizesNOdds.shtm).*
"Frequently Asked Questions about Keno" © 1995, 1998 John C. Hallyburton Jr. (conjelco.com/faq/keno.html).*
Chip Brown, Austin American-Statesman, May 28, 1998, Copyright 1998 The Austin American-Statesman, 2 Pages.
"Powerball Odds & Prizes," available at http://www.powerball.com/pbprizesNOdds.shtrn, printed on Apr. 2, 2003.
EPO Search Report, Jan. 30, 2008.

* cited by examiner

*Primary Examiner* — Tramar Harper
(74) *Attorney, Agent, or Firm* — Dority & Manning, P.A.

(57) ABSTRACT

In a gaming method, player symbol data indicative of a plurality of sets of player symbols associated with a player may be received. Each player symbol is selected from a plurality of possible symbols. An indication that the player submitted a wager associated with the plurality of sets of player symbols may be received. Winning symbol data indicative of a set of winning symbols from the plurality of possible symbols may be received. A value payout based on respective numbers of winning symbols in respective sets of player symbols may be determined, wherein for at least some value payouts the value payout is different than a sum of a plurality of individual value payouts, each individual payout based on the respective number of winning symbols in the corresponding set of player symbols. Player payout data indicative of the value payout may be transmitted.

6 Claims, 12 Drawing Sheets

LOTTERY GAME METHOD

BACKGROUND

The present disclosure is generally related to wagering games, and more particularly, to wagering games in which player selected symbols are compared to winning symbols for determining a value payout to the player.

Lotteries have been in existence for hundreds of years. In more recent times some governments have legalized and sponsored lotteries. A typical lottery game involves the random or pseudo-random drawing of numbers from a pool of numbers. Usually, the pool of numbers includes integer numbers between 1 and some maximum integer, inclusive (e.g., {1, 2, 3, . . . , 49}, {1, 2, 3, . . . , 80}, etc.). A player may pay to select a set of numbers from the pool.

Then, an organization sponsoring the lottery may randomly or pseudo-randomly select a set of winning numbers from the pool of numbers (a “drawing”). The set of winning numbers may be of the same size or of a different size (e.g., as in keno) as the sets of numbers chosen by players. The set of winning numbers are often selected by physically selecting numbered objects (e.g., numbered balls), or by generating the set of winning numbers using a computer. If the player’s set of selected numbers match some or all of the winning numbers, the player may win a value payout. Generally, the more numbers that match, the higher the value payout may be. In some lotteries, the top value payout (the “jackpot”) is awarded when a player’s selected numbers match all of the winning numbers.

Some lotteries offer progressive value payouts where, for example, if nobody wins the jackpot associated with a drawing, the jackpot is rolled over to the next drawing. Frequently, the jackpot will build over multiple drawings before it is finally won. This can lead to a jackpot that is an appreciable sum of money, which increases player interest and lottery ticket sales.

These progressive value payout lotteries, however, often suffer from a lack of interest in drawings immediately after a large jackpot payout, because the jackpot immediately following a large jackpot can be much smaller in comparison. Many players do not participate in a lottery until the jackpot reaches a significant level. Thus, lottery ticket sales typically soar while the jackpot is high, and then drop significantly after the high jackpot is won. Lottery ticket sales will again increase once the jackpot begins to reach high levels.

One technique for increasing ticket sales immediately after a large jackpot has been won for a progressive lottery game is to increase the initial jackpot amount as a way to maintain interest in the lottery. If the jackpot is won on an initial drawing, however, this may result in a jackpot payout that exceeds the revenue of ticket sales for the drawing.

In addition to progressive lottery games, many organizations provide lottery games with fixed pay tables that offer smaller payouts as compared with progressive lottery games. Because of their smaller payouts, these non-progressive lottery games typically generate less player interest and have a smaller customer base as compared to progressive lottery games.

SUMMARY

In one embodiment, a gaming method is provided. The method may comprise receiving player symbol data indicative of a plurality of sets of player symbols associated with a player, wherein each player symbol is selected from a plurality of possible symbols, and receiving an indication that the player submitted a wager associated with the plurality of sets of player symbols. The method may also comprise receiving winning symbol data indicative of a set of winning symbols from the plurality of possible symbols. The method may additionally comprise determining a value payout based on respective numbers of winning symbols in respective sets of player symbols, wherein for at least some value payouts the value payout is different than a sum of a plurality of individual value payouts, each individual payout based on the respective number of winning symbols in the corresponding set of player symbols. The method may further comprise transmitting player payout data indicative of the value payout.

In another embodiment, a gaming server is provided. The gaming server may include a controller operatively coupled to a network, the controller comprising a microprocessor and a memory operatively coupled to the microprocessor. The controller may be configured to receive player symbol data via the network, the player symbol data indicative of a plurality of sets of player symbols associated with a player, wherein each player symbol is selected from a plurality of possible symbols. The controller may also be configured to receive, via the network, an indication that the player has submitted a wager. The controller may additionally be configured to receive winning symbol data indicative of a set of winning symbols from the plurality of possible symbols. The controller may further be configured to determine a value payout based on respective numbers of winning symbols in respective sets of player symbols, wherein for at least some value payouts the value payout is different than a sum of a plurality of individual value payouts, each individual payout based on the respective number of winning symbols in the corresponding set of player symbols. The controller may still further be configured to transmit, via the network, player payout data indicative of the value payout.

In yet another embodiment, another gaming method is provided. The method may comprise receiving a wager from a player, and determining a plurality of sets of player symbols associated with the player, wherein each player symbol is selected from a plurality of possible symbols. The method may additionally comprise selecting a set of winning symbols from the plurality of possible symbols. The method may further comprise determining a value payout based on respective numbers of winning symbols in respective sets of player symbols, wherein for at least some value payouts the value payout is different than a sum of a plurality of individual value payouts, each individual payout based on the respective number of winning symbols in the corresponding set of player symbols. The method may still further comprise providing the value payout, if any, to the player.

In still another embodiment, yet another gaming method is provided. The method may include receiving a wager from a player, and determining a plurality of sets of player symbols associated with the player, wherein each player symbol is selected from a plurality of possible symbols. The method may also include determining a value payout based on respective numbers of winning symbols in respective sets of player symbols, wherein the winning symbols are from a set of winning symbols from the plurality of possible symbols, wherein for at least some value payouts the value payout is different than a sum of a plurality of individual value payouts, each individual payout based on the respective number of winning symbols in the corresponding set of player symbols. The method may further include providing the value payout, if any, to the player.

In yet another embodiment, a gaming apparatus is provided. The gaming apparatus may include a value input device, and a controller operatively coupled to a network and to the value input device, the controller comprising a microprocessor and a memory operatively coupled to the microprocessor. The controller may be configured to determine a wager has been received from a player via the value input device, and to determine a plurality of sets of player symbols associated with the player, wherein each player symbol is selected from a plurality of possible symbols. The controller may additionally be configured to determine a value payout based on respective numbers of winning symbols in respective sets of player symbols, wherein the winning symbols are from a set of winning symbols from the plurality of possible symbols, wherein for at least some value payouts the value payout is different than a sum of a plurality of individual value payouts, each individual payout based on the respective number of winning symbols in the corresponding set of player symbols. The controller may also be configured to provide the value payout, if any, to the player.

Additional aspects of the invention will be apparent to those of ordinary skill in the art in view of the detailed description of various embodiments, which is made with reference to the drawings, a brief description of which is provided below.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
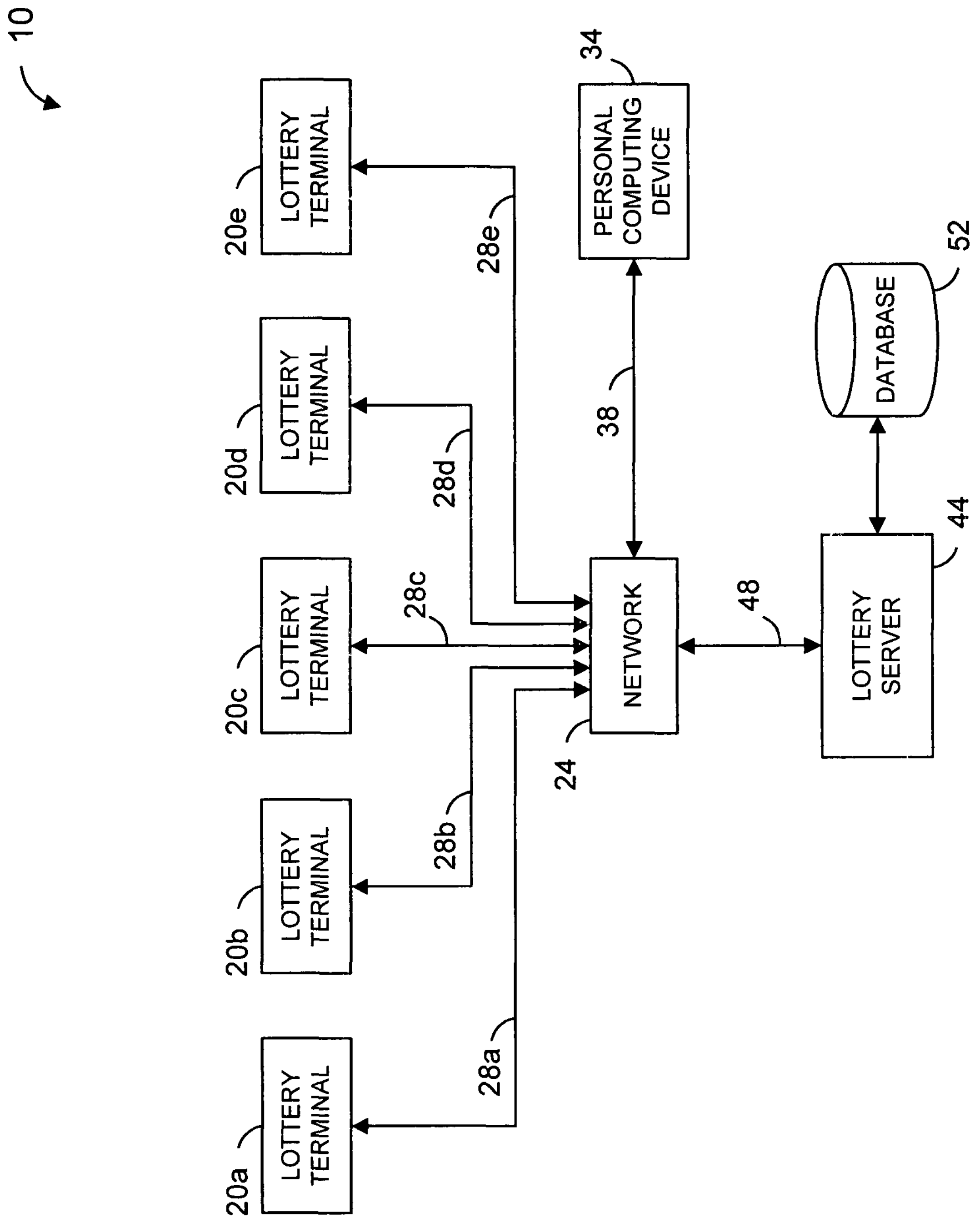
FIG. 1 is a block diagram of an embodiment of a lottery system.

FIG. 1 illustrates one possible embodiment of a lottery gaming system 10 in accordance with the invention. Referring to FIG. 1, the lottery gaming system 10 may include a plurality of lottery terminals 20 operatively coupled to a network 24 via respective communication links 28. The network 24 may comprise, for example, the Internet, a wide area network (WAN), a local area network (LAN), an intranet, an extranet, a wireless communication network (e.g., a cellular phone network, a wireless LAN, etc.), etc. The network 40 may include a plurality of network computers or server computers (not shown), each of which may be operatively interconnected. Where the network 40 comprises the Internet, data communication may take place over the communication links 28 via an Internet communication protocol. The communication links 28 may include a wired connection (e.g., a telephone line, a T1 line, a T3 line, a cable television line, an Ethernet connection, an optical fiber, etc.), and/or a wireless connection (e.g., a wireless LAN, a cellular phone link, a microwave link, a satellite link, etc.). Although each communication link 28 is shown as a single communication link, each communication link 28 may comprise multiple communication links.

Lottery terminals 20 may be located at a location authorized to sell lottery tickets such as, for example, a grocery store, a convenience store, a gas station, a casino, a race track, etc. Additionally, one or more lottery terminals 20 may be located in a secure location for purchases by mail, subscription purchases, etc. Although the system 10 is shown to include five lottery terminals 20*a*, 20*b*, 20*c*, 20*d*, and 20*e*, it should be understood that different numbers of lottery terminals may be utilized. For example, the system 10 may include and tens, hundreds, or thousands of lottery terminals 20.

The lottery system 10 may also include one or more personal computing devices 34 operatively coupled to the network 24 via respective communication links 38. The personal computing device 34 may be used to purchase lottery tickets and/or to inquire about winning lottery numbers from a location other than at a location authorized to sell lottery tickets and other than at a secure location. For example, the personal computing device may be used to purchase one or more lottery tickets and/or to inquire about winning lottery numbers at home via the Internet. The personal computing device 34 may comprise, for example, a desk top computer, a lap top computer, a tablet computer, a set top box, a personal digital assistant (PDA), a cellular phone, a two-way pager, a workstation, a server, a mainframe, etc. The communication link 38 may include a wired connection (e.g., a telephone line, a T1 line, a T3 line, a cable television line, an Ethernet connection, an optical fiber, etc.), and/or a wireless connection (e.g., a wireless LAN, a cellular phone link, a microwave link, a satellite link, etc.). Although the communication link 38 is shown as a single communication link, the communication link 28 may comprise multiple communication links. The personal computing device 34 is optional and may be omitted from the system 10 if desired.

The lottery system 10 also includes a lottery server 44 coupled to the network 24 via a communication link 48. The lottery server 44 may include, for example, a desk top computer, a lap top computer, a workstation, a server, a mainframe, etc. The communication link 48 may include a wired connection (e.g., a telephone line, a T1 line, a T3 line, a cable television line, an Ethernet connection, an optical fiber, etc.), and/or a wireless connection (e.g., a wireless LAN, a cellular phone link, a microwave link, a satellite link, etc.). Although the communication link 48 is shown as a single communication link, the communication link 48 may comprise multiple communication links. The lottery server 44 may be communicatively coupled with a database 52. Although the lottery server 44 is shown as a single server, the lottery server 44 may comprise multiple servers. For example, one server may handle communication with lottery terminals 20 and a separate server may handle communication with personal computing devices 34. Similarly, the database 52 is shown as a single database, the database 52 may comprise multiple databases. For example, one database 52 may be used for storing web page information for a web site related to the lottery system 10, and a separate database may be used to storing more sensitive lottery information.

In operation, players may purchase lottery tickets via the lottery terminals 20 and, optionally, the personal computing device 34. Transaction information related to the purchase of lottery tickets may then be transmitted, via the network 40, to the lottery server 44. The lottery server 44 may then store the transaction information in the database 52. The transaction information may include, for example, selected lottery numbers associated with the ticket, where and when the ticket was purchased, an amount paid for the ticket, etc. The lottery server 44 may keep track of selected lottery numbers, and of revenues from ticket sales.

In some embodiments, communications between one or more of the lottery terminals 20, the lottery server 44, the personal computing device 34, and the database 52 may be secure communications. Various methods, including known methods, may be used to secure such communications.

Lottery Terminal

Figure 2:
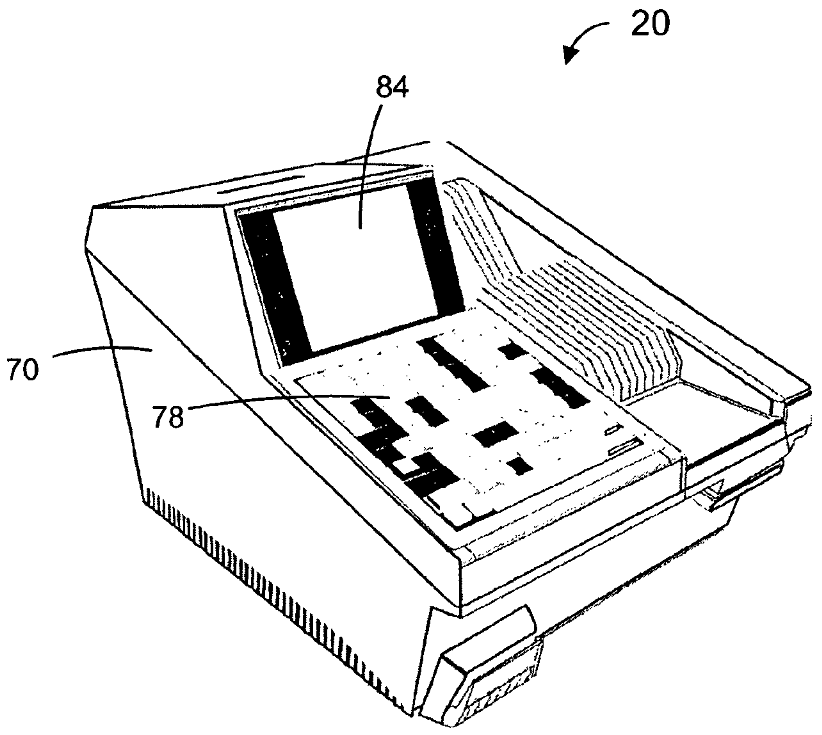
FIG. 2 is a perspective view of an embodiment of one of the lottery terminals shown schematically in FIG. 1.

FIG. 2 is a perspective view of one possible embodiment of one or more of the lottery terminals 20. Although the following description addresses the design of the lottery terminals 20, it should be understood that the design of one or more of the lottery terminals 20 may be different than the design of other lottery terminals 20. Each lottery terminal 20 may have various different structures and methods of operation. For exemplary purposes, various designs of the lottery terminals 20 are described below, but it should be understood that numerous other designs may be utilized.

Referring to FIG. 2, the lottery terminal 20 may include a housing or cabinet 70 and one or more input devices, which may include a keyboard 78. The keyboard 78 may be used to select lottery numbers on a lottery ticket, to select the number of tickets to be purchased, etc.

The lottery terminal 20 may also include a lottery ticket printer (not shown). The lottery ticket printer may be used to print and/or otherwise encode lottery tickets. The lottery tickets may be composed of paper or another printable or encodable material and may have one or more of the following informational items printed or encoded thereon: the selected numbers, the lottery drawing(s) with which the lottery ticket is associated, a validation number, a bar code with control and/or security data, the date and time of issuance of the lottery ticket, the location at which the lottery ticket was issued, redemption instructions and restrictions, and any other information that may be necessary or desirable. The lottery tickets could be printed with an optically readable material such as ink, or data on the lottery ticket could be magnetically, electrically, optically, etc. encoded.

The lottery terminal 20 may include a display unit 84 for displaying information related to the purchase of lottery tickets. In addition to, or as an alternative to, the keyboard 78, the display unit 84 may include a touch sensitive area or areas for inputting data to the lottery terminal 20.

Figure 3:
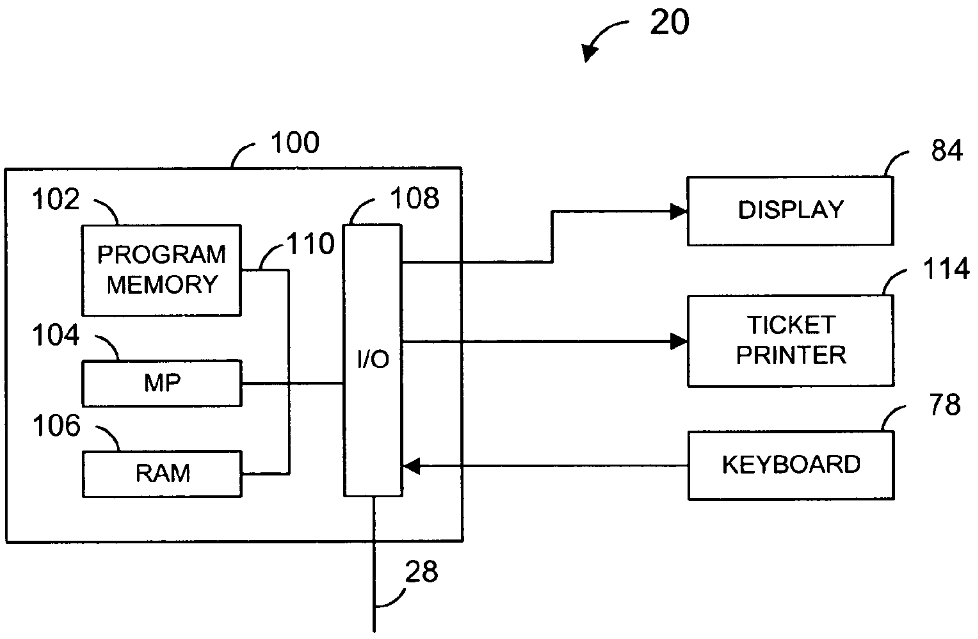
FIG. 3 is a block diagram of electronic components of the lottery terminal of FIG. 2.

FIG. 3 is a block diagram of a number of components that may be incorporated in the lottery terminal 20. Referring to FIG. 3, the lottery terminal 20 may include a controller 100 that may comprise a program memory 102, a microcontroller or microprocessor (MP) 104 (hereinafter "microprocessor 104"), a random-access memory (RAM) 106, and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memory or memories 102 may be implemented as semiconductor memories, magnetically readable memories, and/or optically readable memories, for example.

The program memory 102 may be a read-only memory (ROM), or a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the keyboard 78, the display unit 84, and a ticket printer 114 may be operatively coupled to the I/O circuit 108. Each of these components may be so coupled by either a unidirectional or bidirectional, single-line or multiple-line data link, which may depend on the design of the component that is used. As shown in FIG. 3, the components 78, 84, 114 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Lottery Server

Figure 4:
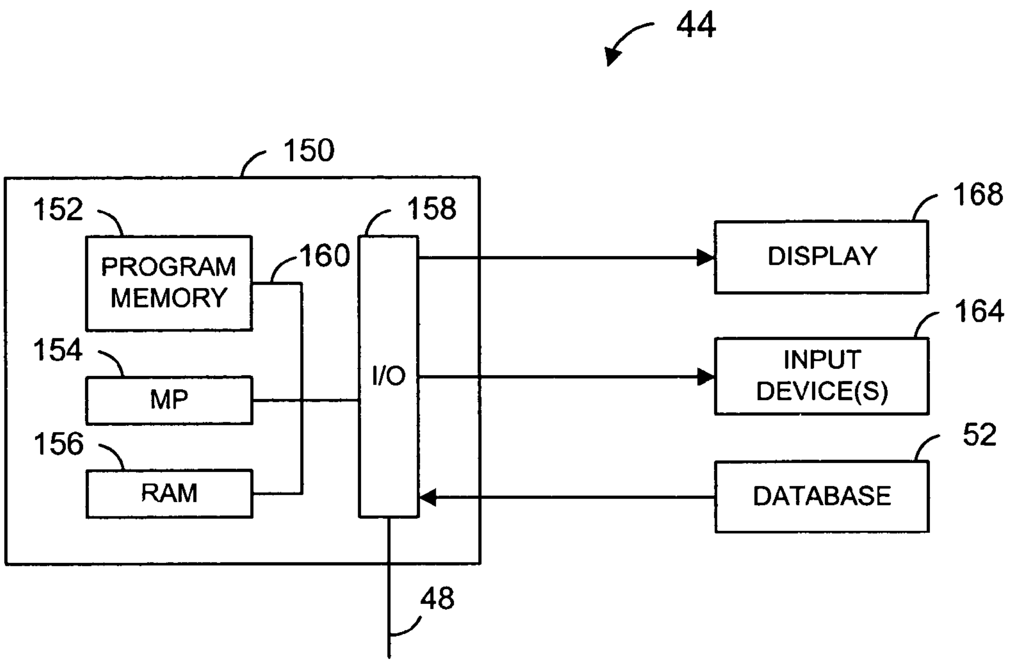
FIG. 4 is a block diagram of electronic components of the lottery server shown schematically in FIG. 1.

FIG. 4 is a block diagram of a number of components that may be incorporated in or coupled to the lottery server 44. Referring to FIG. 4, the lottery server 44 may include a controller 150 that may comprise a program memory 152, a microcontroller or microprocessor (MP) 154 (hereinafter "microprocessor 154"), a RAM 156, and an I/O circuit 158, all of which may be interconnected via an address/data bus 160. It should be appreciated that although only one microprocessor 154 is shown, the controller 150 may include multiple microprocessors 154. Similarly, the memory of the controller 150 may include multiple RAMs 156 and multiple program memories 152. Although the I/O circuit 158 is shown as a single block, it should be appreciated that the I/O circuit 158 may include a number of different types of I/O circuits. The RAM(s) 154 and program memory or memories 152 may be implemented as semiconductor memories, magnetically readable memories, and/or optically readable memories, for example.

The program memory 152 may be a ROM, or a read/write or alterable memory, such as a hard disk. In the event a hard disk is used as a program memory, the address/data bus 160 shown schematically in FIG. 4 may comprise multiple address/data buses, which may be of different types, and there may be an I/O circuit disposed between the address/data buses.

The lottery server 44 may include one or more input devices 164 (e.g., keyboard, key pad, mouse, touch screen, etc.), and a display 168. FIG. 4 illustrates that the input device(s) 164, the display unit 168, and the database 52 may be operatively coupled to the I/O circuit 158. Each of these components may be so coupled by either a unidirectional or bidirectional, single-line or multiple-line data link, which may depend on the design of the component that is used. As shown in FIG. 4, the components 52, 164, and 168 may be connected to the I/O circuit 158 via a respective direct line or conductor. Different connection schemes could be used. For example, one or more of the components shown in FIG. 4 may be connected to the I/O circuit 158 via a common bus or other data link that is shared by a number of components. Furthermore, some of the components may be directly connected to the microprocessor 154 without passing through the I/O circuit 158.

Lottery Method

Embodiments of methods that may be implemented via the lottery system 10 (FIG. 1) are described below in connection with a number of flow diagrams. Some or all of each flow diagram may be implemented by portions or routines of one or more computer programs, which may be stored in one or more of the memories of the controller 100 of the lottery terminal 20 and/or of the controller 150 of the lottery server 44. Computer program(s) or portions thereof may be stored remotely, outside of the lottery terminal 20, and may control the operation of the lottery terminal 20 from a remote location. Such remote control may be facilitated with the use of a wired connection, wireless connection, an Internet interface, etc. that connects the lottery terminal 20 with a remote computer (such as one of the lottery server 44) having a memory in which the computer program portions are stored. The computer program portions may be written in any high level language such as C, C++ or the like or any low-level, assembly or machine language. By storing the computer program portions therein, various portions of the memories 102, 106, 152, and 156 are physically and/or structurally configured in accordance with computer program instructions.

Figure 5:
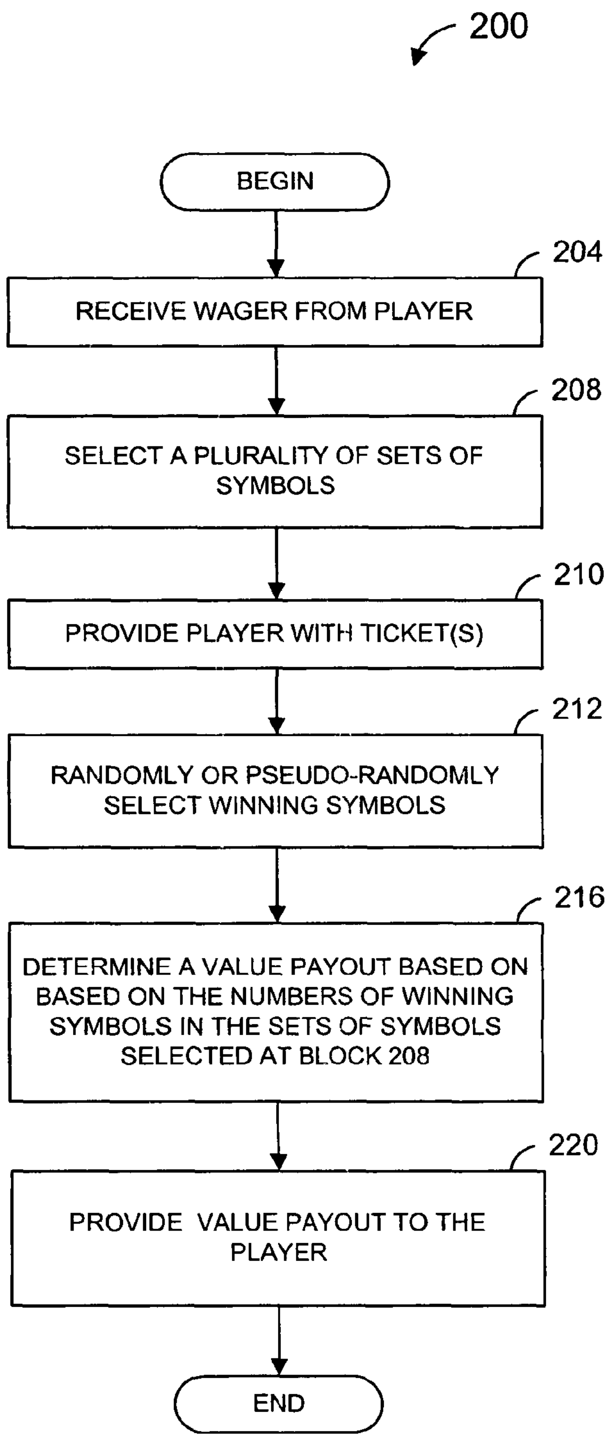
FIG. 5 is a flow diagram of an embodiment of a lottery method.

FIG. 5 is a flow diagram of one embodiment of a method related to playing a lottery game. As will be described in more detail below, the method 200 provides a player additional ways to win a prize in a lottery as compared to traditional lotteries. More particularly, if the player purchases multiple sets of symbols, the player may be able to win a prize based on the number and/or the distribution of winning symbol matches among the multiple sets. In some embodiments, a player may be able to win an enhanced prize by buying more than one set of symbols. Thus, these embodiments may encourage players to purchase more sets of symbols, leading to increased sales. The flow diagram of FIG. 5 will be described with reference to FIG. 1.

At block 204, a wager from a player may be received for playing in a drawing of a lottery. The wager may be received by, for example, an operator of a lottery terminal 20. In addition, the wager may be received via, for example, a lottery subscription service, a postal service, the Internet, etc. The wager may provide the player with, for example, multiple associated entries in the lottery, and the amount of the wager may be based on the number of associated entries desired by the player. The entries are "associated" because, as will be described in more detail below, a prize may be based on the number and/or the distribution of winning number matches among the multiple entries.

In some embodiments, a player may purchase a number of associated entries up to a maximum number of entries. The maximum number of associated entries may be, for example, 2, 3, 4, or 5. The maximum number of entries may also be 6 or more. In some embodiments, a player may purchase multiple associated entries in units of one entry. In other embodiments, a player may purchase associated entries in units of, for example, two entries, three entries, four entries, five entries, etc.

At block 208, a plurality of sets of symbols from a pool of possible symbols is selected for, and/or by, the player. The pool of possible symbols may be a set of integers such as {1, 2, 3, . . . , 55}. The symbols need not be integers, but could be other types of symbols such as letters, words, abbreviations, icons, etc. In one embodiment, N symbols may be selected from the pool of possible symbols for each of the sets of symbols. N may be the number of symbols to be randomly or pseudo-randomly selected in the drawing. Alternatively, N may be less than the number symbols to be randomly or pseudo-randomly selected in the drawing (e.g., as in a keno game). Selecting the plurality of sets of symbols will be described in further detail below. For ease of explanation of the flow diagram of FIG. 5, it will be assumed that N symbols are selected for each set of a plurality of sets of symbols, where N is the number of symbols to be randomly or pseudo-randomly selected in the drawing. As will be described further below, however, this need not be required.

Some or all of the sets of symbols may be selected by the player. The remaining sets, if any, may be, for example, pseudo-randomly generated by a computer (e.g., a lottery terminal 20 or lottery server 44). Alternatively, all of the sets of symbols may be pseudo-randomly generated by a computer.

At block 210, the player may be provided with a ticket that indicates the sets of symbols selected at block 208. The ticket may be in a variety of forms including paper form and electronic form. The ticket may include security measures to help prevent fraud. Such security measures may include various security techniques, including security techniques well know to those skilled in the art.

Figure 6:
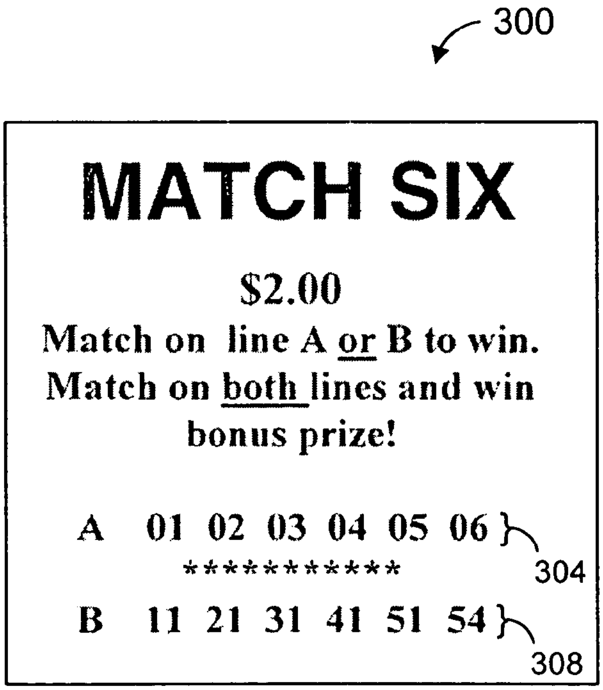
FIG. 6 is an illustration of an example lottery ticket.

FIG. 6 is an illustration of an example lottery ticket 300 that may be employed in embodiments of the present invention. The lottery ticket 300 indicates that a player has selected 2 sets of 6 symbols: the set 304 of integers 1, 2, 3, 4, 5, and 6, and the set 308 of integers 11, 21, 31, 41, 51, and 54. For ease of explanation, it will be assumed that the pool of possible symbols from which the sets 304 and 308 were selected is the set of integers {1, 2, 3, . . . , 55}.

Figure 7:
FIG. 7 is an illustration of another example lottery ticket.

FIG. 7 is an illustration of another example lottery ticket 350 that may be employed in embodiments of the present invention. The lottery ticket 350 indicates that a player has selected 5 sets of 6 symbols: the set 354 of integers 5, 6, 7, 19, 21, and 43, the set 358 of integers 10, 12, 32, 38, 41, and 49, the set 362 of integers 2, 3, 14, 34, 36, and 45, the set 366 of integers 9, 18, 38, 39, 40, and 41, and the set 370 of integers 5, 8, 38, 45, 46, and 49. For ease of explanation, it will be assumed that the pool of possible symbols from which the sets 354, 358, 362, 366, and 370 were selected is the set of integers {1, 2, 3, . . . , 55}.

The lottery ticket 350 may include an identifier associated with the ticket and/or the associated sets of symbols printed on the ticket. The identifier may include, for example, a numeric (or alphanumeric) identifier 382 and/or a bar code identifier 384. Various other identifiers could also be used, such as identifiers known to those of ordinary skill in the art. The identifier(s) may be preprinted on the paper on which tickets are to be printed. Alternatively, the identifier(s) may be printed at the time the ticket is purchased by, for example, the lottery terminal 20 of FIG. 1. For electronic tickets, the identifier may comprise an encoding, digital signature, etc.

Referring again to FIG. 5, at block 212, a set of winning symbols may be randomly of pseudo-randomly selected. The set of winning symbols may be selected using a variety of techniques, including techniques well known to those of ordinary skill in the art. For example, selecting the set of winning symbols could include randomly selecting balls from a group of balls, where each ball is associated with one of the symbols from the pool of possible symbols. Objects other than balls may be utilized as well. As another example, selecting the set of winning symbols could include pseudo-randomly generating the set of winning symbols with a computer such as the lottery server 44. A computer or computers other than the lottery server 44 may be used as well.

At block 216, a value payout may be determined based on the numbers of winning symbols in the sets of symbols selected at block 208. For at least some value payouts determined at block 216, the value payout is different as compared to a sum of individual payouts, where each individual payout is based on the respective number of winning symbols in the corresponding set of symbols selected at block 208.

Table 1 illustrates a pay table for one embodiment in which a maximum of two sets of symbols ("Hand a" and "Hand B") may be selected at block 208, where each set includes six symbols. Additionally, in this embodiment, the number of winning symbols selected at block 212 is six. Further, in this embodiment, the pool of possible symbols is the set of integers {1, 2, 3, . . . , 55}. As can be seen in Table 1, at least some of the payouts differ from that of the sum of payouts for individual hands. For example, the payout for matching three symbols in each of Hand A and Hand B is $50. The individual payout for matching three symbols in one hand is $5. Thus, the sum of individual payouts for matching three symbols in each of Hand A and Hand B would be $10, which is less than $50.

TABLE 1

| Number of Matches | Hand A 6 | Hand A 5 | Hand A 4 | Hand A 3 | Hand A 2 | Hand A 1 | Hand A 0 |
|---|---|---|---|---|---|---|---|
| Hand B 6 | Jackpot | Jackpot | Jackpot | Jackpot | Jackpot | Jackpot | Jackpot |
| Hand B 5 | Jackpot | Jackpot | Jackpot | $50,000 | $1,000 | $2,000 | $2,000 |
| Hand B 4 | Jackpot | Jackpot | $25,000 | $1,000 | $100 | $75 | $75 |
| Hand B 3 | Jackpot | $50,000 | $1,000 | $50 | $15 | $5 | $5 |
| Hand B 2 | Jackpot | $5,000 | $100 | $15 | $4 | Free Ticket | Free Ticket |
| Hand B 1 | Jackpot | $2,000 | $75 | $5 | Free Ticket | 0 | 0 |
| Hand B 0 | Jackpot | $2,000 | $75 | $5 | Free Ticket | 0 | 0 |

As can be seen in Table 1, the value payout may be different even if the aggregate number of matching symbols in Hand A and Hand B are the same. For example, the value payout for matching three symbols in each of the two hands (six total matches) is $50. On the other hand, the value payout for matching four symbols in one hand and two symbols in the second hand (six total matches) is $100. Thus, the value payout may be based on the distribution of matches in the multiple sets. In other embodiments, the value payout need not be based on the distribution of matches in the multiple sets.

Tables 2, 3, and 4 illustrate various parameters and estimates associated with one specific embodiment in which a player buys two sets of numbers for two dollars. The pool of possible numbers comprises the integers {1, 2, 3, . . . , 55}, and the payouts are as in Table 1. The estimates were based on projected sales in the state of Indiana.

TABLE 2

| Prize | Estimated Number of Annual Winners | Odds | Estimated Number of Winners Per Draw | Percent of Winners | Extended Liability | Percent of Prize Fund |
|---|---|---|---|---|---|---|
| $ 4 | 461,520.06 | 83.20 | 4,437.68 | 5.2% | $1,846,080 | 4.5% |
| 5 | 856,153.15 | 44.85 | 8,232.24 | 9.7% | 4,280,766 | 10.5% |
| 15 | 107,019.14 | 358.81 | 1,029.03 | 1.2% | 1,605,287 | 3.9% |
| 50 | 6,204.01 | 6,189.55 | 59.65 | 0.1% | 310,200 | 0.8% |
| 75 | 40,986.06 | 936.90 | 394.10 | 0.5% | 3,073,954 | 7.6% |
| 100 | 5,123.26 | 7,495.23 | 49.26 | 0.1% | 512,326 | 1.3% |
| 1,000 | 594.00 | 64,646.38 | 5.71 | 0.0% | 594,001 | 1.5% |
| 2,000 | 683.10 | 56,214.24 | 6.57 | 0.0% | 1,366,202 | 3.4% |

TABLE 2-continued

| Prize | Estimated Number of Annual Winners | Odds | Estimated Number of Winners Per Draw | Percent of Winners | Extended Liability | Percent of Prize Fund |
|---|---|---|---|---|---|---|
| 5,000 | 85.39 | 449,713.93 | 0.82 | 0.0% | 426,938 | 1.0% |
| 25,000 | 14.22 | 2,700,782.01 | 0.14 | 0.0% | 355,453 | 0.9% |
| 50,000 | 9.90 | 3,878,782.67 | 0.10 | 0.0% | 495,001 | 1.2% |
| 1.06 | 7,384,320.92 | 5.20 | 71,003.09 | 83.3% | 7,827,380 | 19.2% |
| $5,759,452 | 3.13 | 12,279,727.18 | 0.03 | 0.0% | 18,010,412 | 44.2% |
| Totals | $8,862,716.32 | 4.33 | 85,218.43 | 100.0% | $40,704,000 | 100.0% |

TABLE 3

| Match | | | Estimated Number of Annual | | |
|---|---|---|---|---|---|
| Base | Add-On | Odds | Winners | Prize | Extended Liability |
| 6 | 0 | 60,098,134.83 | 0.64 | | |
| 5 | 0 | 204,415.42 | 187.85 | $ 2,000 | $ 375,706 |
| 4 | 0 | 3,406.92 | 11,271.17 | 75 | 845,337 |
| 3 | 0 | 163.10 | 235,442.12 | 5 | 1,177,211 |
| 2 | 0 | 18.91 | 2,030,688.25 | 1.06 | 2,152,530 |
| 6 | 1 | 73,453,275.66 | 0.52 | | |
| 5 | 1 | 249,841.07 | 153.70 | 2,000 | 307,395 |
| 4 | 1 | 4,164.02 | 9,221.86 | 75 | 691,640 |
| 3 | 1 | 199.34 | 192,634.46 | 5 | 963,172 |
| 2 | 1 | 23.11 | 1,661,427.21 | 1.06 | 1,761,161 |
| 6 | 2 | 264,431,782.37 | 0.15 | | |
| 5 | 2 | 899,427.87 | 42.69 | 5,000 | 213,469 |
| 4 | 2 | 14,990.46 | 2,561.63 | 100 | 256,163 |
| 3 | 2 | 717.63 | 53,509.57 | 15 | 802,644 |
| 2 | 2 | 83.20 | 461,520.06 | 4 | 1,846,080 |
| 1 | 2 | 23.11 | 1,661,472.21 | 1.06 | 1,761,161 |
| 0 | 2 | 18.91 | 2,030,688.25 | 1.06 | 2,152,530 |
| 6 | 3 | 2,280,724,209.20 | 0.02 | | |
| 5 | 3 | 7,757,565.34 | 4.95 | 50,000 | 247,500 |
| 4 | 3 | 129,292.76 | 297.00 | 1,000 | 297,000 |
| 3 | 3 | 6,189.55 | 6,204.01 | 50 | 310,200 |
| 2 | 3 | 717.63 | 53,509.57 | 15 | 802,644 |
| 1 | 3 | 199.34 | 192,634.46 | 5 | 963,172 |
| 0 | 3 | 163.10 | 235,442.12 | 5 | 1,177,211 |
| 6 | 4 | 47,641,794,592.16 | 0.00 | | |
| 5 | 4 | 162,046,920.38 | 0.24 | | |
| 4 | 4 | 2,700,782.01 | 14.22 | 25,000 | 355,453 |
| 3 | 4 | 129,292.76 | 297.00 | 1,000 | 297,000 |
| 2 | 4 | 14,990.46 | 2,561.63 | 100 | 256,163 |
| 1 | 4 | 4,164.02 | 9,221.86 | 75 | 691,640 |
| 0 | 4 | 3,406.92 | 11,271.17 | 75 | 845,337 |
| 6 | 5 | 2,858,507,675,529.34 | 0.00 | | |
| 5 | 5 | 9,722,815,222.89 | 0.00 | | |
| 4 | 5 | 162,046,920.38 | 0.24 | | |
| 3 | 5 | 7,757,565.34 | 4.95 | 50,000 | 247,500 |
| 2 | 5 | 899,427.87 | 42.69 | 5,000 | 213,469 |
| 1 | 5 | 249,841.07 | 153.70 | 2,000 | 307,359 |
| 0 | 5 | 204,415.42 | 187.85 | 2,000 | 375,706 |
| 6 | 6 | ################ | 0.00 | | |
| 5 | 6 | 2,858,507,675,529.34 | 0.00 | | |
| 4 | 6 | 47,641,794,592.16 | 0.00 | | |
| 3 | 6 | 2,280,724,209.20 | 0.02 | | |
| 2 | 6 | 264,431,792.37 | 0.15 | | |
| 1 | 6 | 73,453,275.66 | 0.52 | | |
| 0 | 6 | 60,098,134.63 | 0.64 | | |

TABLE 4

| Parameters and Estimates/General | | |
|---|---|---|
| Sales | | 38,400,000 |
| Cost | $ | 2.00 |
| Revenue | $ | 76,800,000 |
| Payout | | 53.0% |

TABLE 4-continued

| Parameters and Estimates/General | | |
|---|---|---|
| Prize Fund | $ | 40,704,000 |
| Secondary Prizes | $ | 22,693,588 |
| Jackpot Funding | $ | 18,010,412 |
| Jackpot Winners | | 3.13 |

TABLE 4-continued

| Parameters and Estimates/General | | |
|---|---|---|
| Jackpot Odds | | 12,279,727 |
| Average Jackpot | $ | 5,759,452 |
| Bonus Prizes | | 580,570 |
| Bonus Prize Odds | | 66.14 |
| Base Prizes | | 8,282,143 |
| Base Prize Odds | | 4.64 |
| Total Prizes | | 8,862,716 |
| Overall Odds | | 4.33 |

It is to be understood that the value payouts of Table 1 and the parameters and estimates of Tables 2-4 are associated with merely one specific embodiment. One of ordinary skill in the art will recognize that different value payouts and parameters can be used depending on various factors including, for example, one or more of the number of sets of symbols that may be selected at block 208, the number of symbols in each of the sets of symbols selected at block 208, the size of the pool of winning symbols, whether winning symbols are selected with or without replacement, the size of the jackpot, the fee per set of symbols selected by a player, a desired level of revenue, a desired level of profit, projected sales, etc. Additionally, value payouts can be forms of value other than dollar amounts and free tickets. For example, value payouts may include a gift certificate, a voucher (e.g., towards a restaurant meal, airfare, vacation, etc.), casino credits, an automobile, real estate, etc.

Various methods for determining the value payout (block 216) may be utilized. For example, the value payout could be retrieved from a lookup table or database based on the numbers of matches in the sets of symbols selected at block 208. In one embodiment, the value payout may be retrieved from a multi-dimensional lookup table or database. For example, Table 1 is indicative of one embodiment of a two-dimensional lookup table.

In other embodiments, the value payout may be determined by first determining a base value payout and, optionally, a bonus value payout. The value payout may then be determined based on the base value payout and the bonus value payout. For example, the value payout may be determined as the maximum of the base value payout and the bonus value payout. As another example, the value payout may be determined as the sum of the base value payout and the bonus value payout. As yet another example, the value payout may be determined as the base value payout if the base value payout is a non-zero value. If the base value payout is a zero value, the value payout may be determined as the bonus value payout. In this example, the bonus value payout optionally may be determined only if needed (i.e., only if the base value payout is a zero value).

In embodiments in which a base value payout and/or a bonus value payout are to be determined, the base value payout may be determined based on the individual payouts for individual sets selected at block 208. For example, the base value payout may be the sum of the individual value payouts or the maximum of the individual payouts.

Additionally, the bonus value payout may be determined based on the aggregate number of winning symbols in the multiple sets of symbols selected at block 208. The bonus value payout may be additionally based on the distribution of winning symbols in the multiple sets of symbols. For instance, the value of the bonus value payout may vary based on the number of sets that include at least one winning symbol. As another example, the value of the bonus value payout may vary based on the maximum number of winning symbols in any one set of symbols.

Figure 8A:
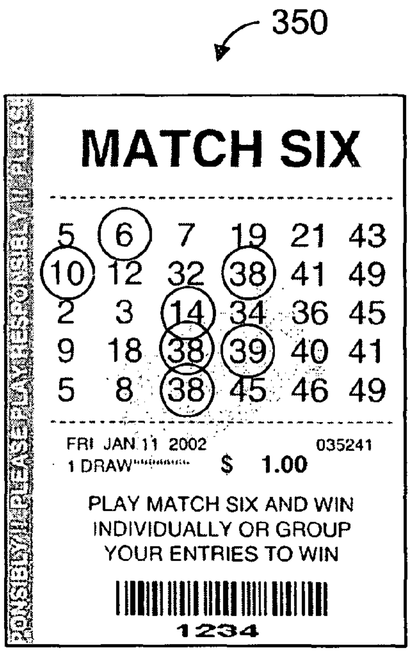
FIGS. 8A and 8B are illustrations of the example lottery ticket of FIG. 7 with winning numbers indicated.
Figure 8B:
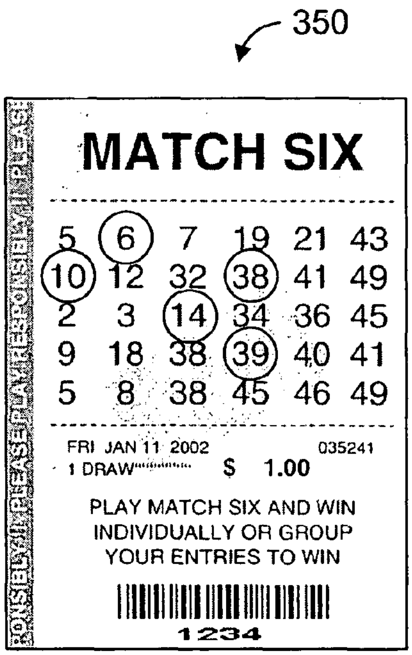

In the above-described embodiments (i.e., FIGS. 5-7), multiple occurrences of the same winning symbol may or may not count towards the value payout. FIGS. 8A and 8B are illustrations of the example lottery ticket 350 of FIG. 7 with example winning symbols (integers 6, 10, 14, 38, and 39) circled. In the example lottery ticket 350, the winning symbol "38" occurs three times. FIG. 8A provides an illustration of winning symbols where each occurrence of a winning symbol that occurs multiple times counts toward the value payout. Thus, in FIG. 8A, each occurrence of the winning symbol "38" is circled. FIG. 8B provides an illustration of an aggregate number of winning symbols where only one occurrence of a winning symbol that occurs multiple times counts toward the value payout. Thus, in FIG. 8B, only one occurrence of the winning symbol "38" is circled.

In embodiments where one occurrence of a winning symbol that occurs multiple times counts towards the value payout, the one occurrence of the winning symbol may be determined using various methods. For example, the first occurrence of the winning symbol or a randomly or pseudo-randomly selected occurrence may be used. As another example, an occurrence may be selected so that the value payout is maximized.

At block 220, the value payout determined at block 216 may be provided to the player. If the value payout is zero, no value payout may be provided to the player.

Lottery Server Operation

Figure 9:
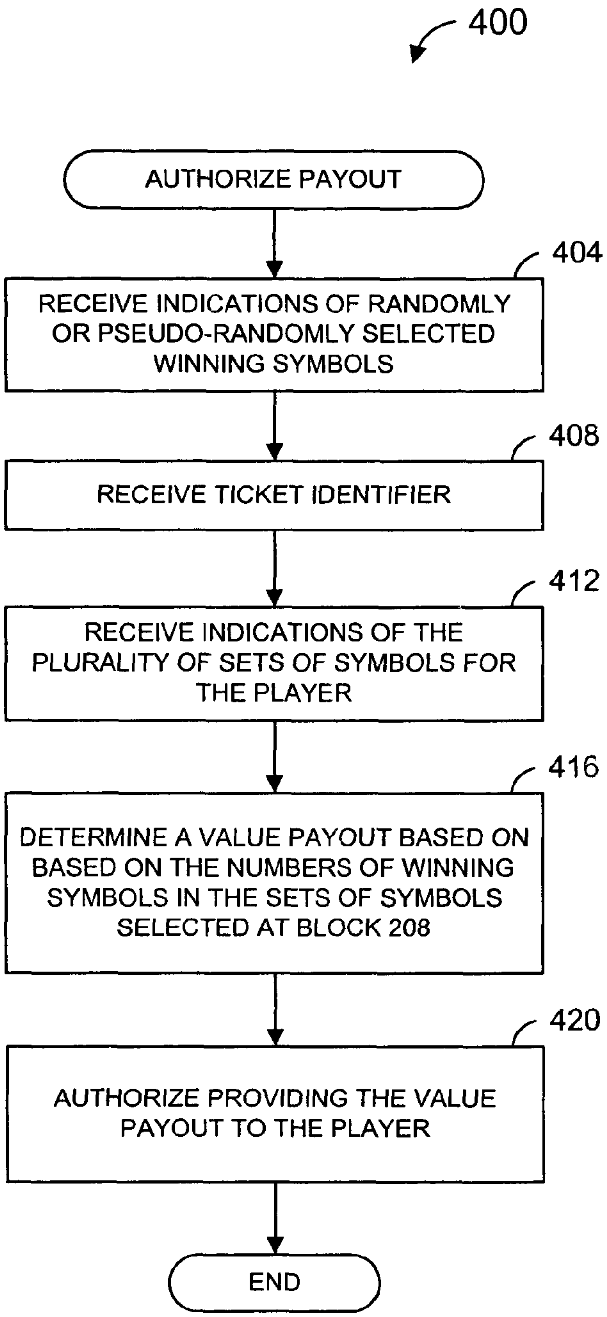
FIG. 9 is a flow diagram of an embodiment of a routine that may be performed by the lottery server shown in FIG. 1.

FIG. 9 is a flowchart of one embodiment of a routine 400 that may be implemented by the lottery server 44 of FIG. 1. Although the routine 400 is described below as being implemented by the lottery server 44, some or all of the routine may be implemented by another computing device. Some or all of the routine 400 may be stored in the memory of the controller 150 of the lottery server 44. Alternatively or additionally, some or all of the routine 400 may also be stored in another computing device.

At block 404, the lottery server 44 may receive an indication or indications of winning symbols in a set of winning symbols associated with a lottery drawing. The indication(s) may be received, for example, via a user interface of the lottery server 44, from a computing device communicatively coupled to the lottery server 44 via the network 24 or some other network or communication link (not shown), etc. The indication(s) may be indicative of the winning symbols that were randomly or pseudo-randomly selected at block 212 of FIG. 5.

At block 408, the lottery server 44 may receive an identifier associated with a plurality of sets of symbols selected for and/or by a player. The identifier may be, for instance, an identifier associated with a ticket purchased by the player, such as the ticket 300 of FIG. 6 or the ticket 350 of FIG. 7. Referring to FIG. 7, the identifier may include, for example, the numeric (or alphanumeric) identifier 382 and/or the bar code identifier 384. The identifier may be, for example, a validation number or some other identifier associated with the plurality of sets of symbols selected by the player At block 412, the lottery server 44 may receive indications of the symbols in the plurality of sets of symbols for the player. The indications may be received, for example, from the database 52. For instance, the lottery server 44 may use the identifier(s) received at block 408 to look up in the database 52, or query the database 52 for, the indications of the symbols in the plurality of sets of symbols for the player.

At block 416, the lottery server 44 may determine a value payout in the manner described above with reference to block 216 of FIG. 5, or in a similar manner. At block 420, the lottery server 44 may authorize providing the value payout. The lottery server 44 may authorize providing the value payout by, for example, sending an authorization code, indicator, etc., to a lottery terminal 20 or some other computing device. As another example, the lottery server 44 could display an authorization code, indicator, etc. on a user interface of the lottery server 44.

Selection of Winning Symbols/Player Selection of Symbols

Selecting the symbols from the pool of possible symbols for and/or by the player may comprise selecting symbols from a set of symbols with or without replacement. In other words, in some embodiments the same symbol may be selected multiple times, and in other embodiments all selected symbols may be required to be different symbols. Additionally, some subset of the symbols may be selected without replacement, but the remaining of the symbols could be selected with the previously selected symbols replaced. For example, a plurality of different symbols and one additional symbol that need not be different than any of the other symbols could be selected. For instance, if the symbols are integers, a first subset of symbols could be selected from a pool of symbols such as the set of integers {1, 2, 3, . . . , 53} without replacement, and one additional integer could be selected from the pool {1, 2, 3, . . . 53} with the previously selected subset of integers replaced.

In embodiments where N symbols are selected for each set, the N symbols may be selected from one or more sets of symbols, with or without replacement. For instance, N−1 integers may be selected from the pool {1, 2, 3, . . . , 53} without replacement, and one additional integer may be selected from the pool { 1, 2, 3, . . . 42}, with all previously selected integers (other than {43, 44, . . . , 53}) replaced.

The pool of possible symbols from which winning symbols and player symbols may be selected may comprise various different pools. For example, the pool of possible symbols may include sets of integers that are popular with present lotteries such as {0, 1, 2, . . . , 9}, {1, 2, 3, . . . , 27}, {1, 2, 3, . . . , 30}, {1, 2, 3, . . . , 39}, {1, 2, 3, . . . 42}, {1, 2, 3, . . . , 47}, {1, 2, 3, . . . , 48}, {1, 2, 3, . . . , 49}, {1, 2, 3, . . . , 52}, {1, 2, 3, . . . 53}, {1, 2, 3, . . . 55}, {1, 2, 3, . . . , 57}, or {1, 2, 3, . . . , 80}. The pool of possible symbols may include sets of integers other than the above sets as well. Moreover, as discussed previously, the symbols need not be integers, but could be other types of symbols such as letters, words, abbreviations, icons, etc.

Figure 10:
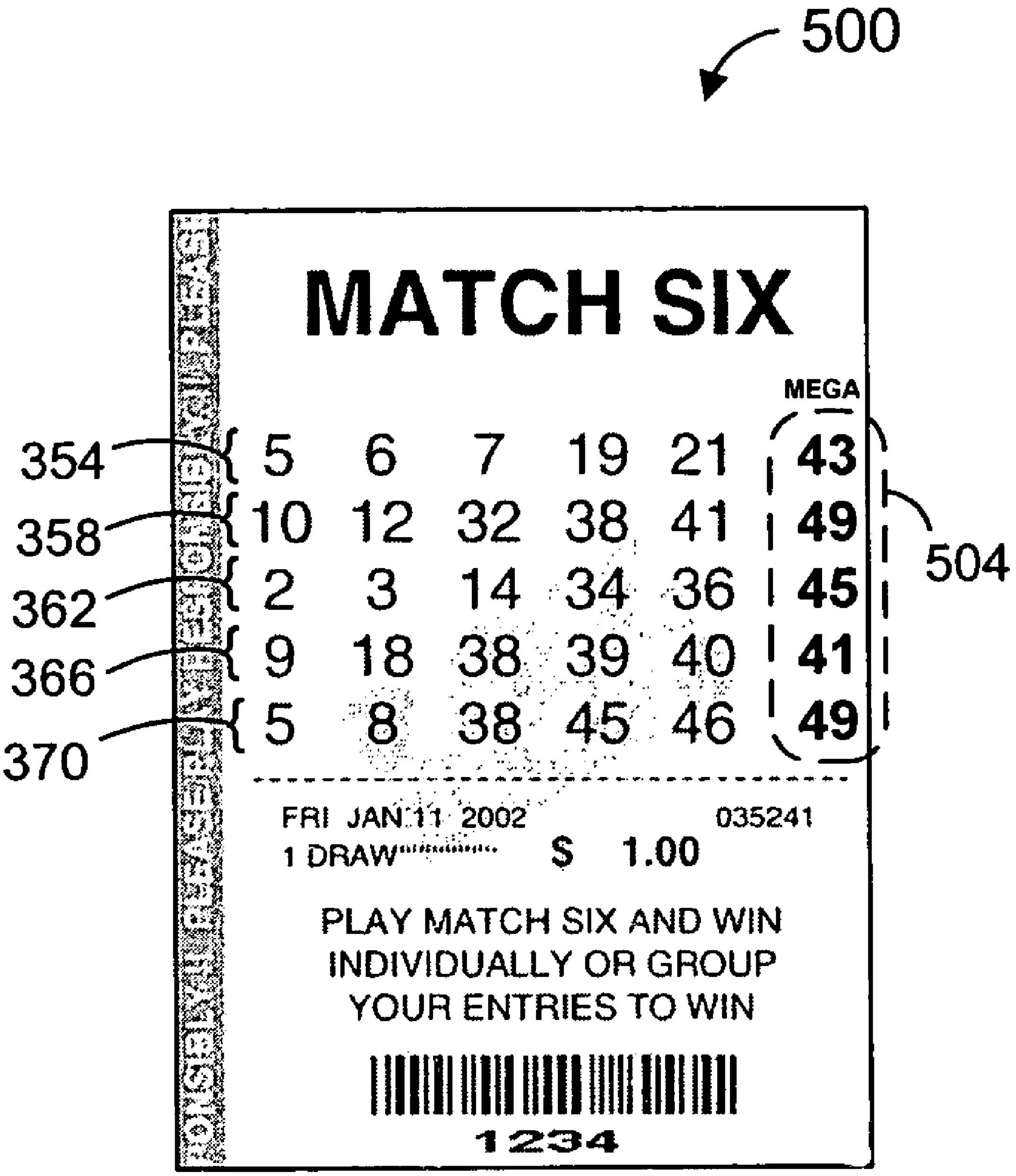
FIG. 10 is an illustration of yet another example lottery ticket.

FIG. 10 is an illustration of another example lottery ticket 500 that may be employed in embodiments of the present invention. The lottery ticket 500 is similar to the lottery ticket 350 of FIG. 7 in that it indicates that the five sets of six sets of integers were selected by the player (sets 354, 358, 362, 366, and 370). With the lottery ticket 500, however, the first five integers in each set were selected from the pool of integers {1, 2, 3, . . . , 55} without replacement. The last integer in each set (indicated as 504 in FIG. 10) was selected from the pool of integers {1, 2, 3, . . . , 55} with all previously selected integers replaced.

In some embodiments, one or more of the sets selected by the player may include less than the number of winning symbols to be selected. For example, in keno, twenty winning symbols are typically selected, but players typically can only choose a maximum number of symbols less than twenty. In embodiments in which a player can choose a number of symbols equal to the number of winning symbols to be selected, a player may be able to choose one or more sets that include less than the number of winning symbols to be selected.

As described previously, the set of winning symbols may be randomly of pseudo-randomly selected using a variety techniques, including techniques well know to those of ordinary skill in the art. For example, selecting the set of winning symbols may include randomly selecting objects from a group of objects (e.g., balls), and/or pseudo-randomly generating winning symbols with a computer. In embodiments in which selecting winning symbols includes randomly selecting balls from a pool of balls, selection with and without replacement may be implemented using various techniques including techniques well know to those of ordinary skill in the art. For instance, a first set of balls from a first pool of balls marked 1, 2, 3, . . . , 53 may be randomly selected without replacement. Then, one additional ball may be randomly selected from a second pool of balls marked 1, 2, 3, . . . , 42. As another example, a first set of balls from a first pool of balls market 1, 2, 3, . . . , 53 may be randomly selected without replacement. Then, one additional ball may be randomly selected from a second pool of balls market 1, 2, 3, . . . , 53.

Gaming Apparatus Implementations

Figure 11:
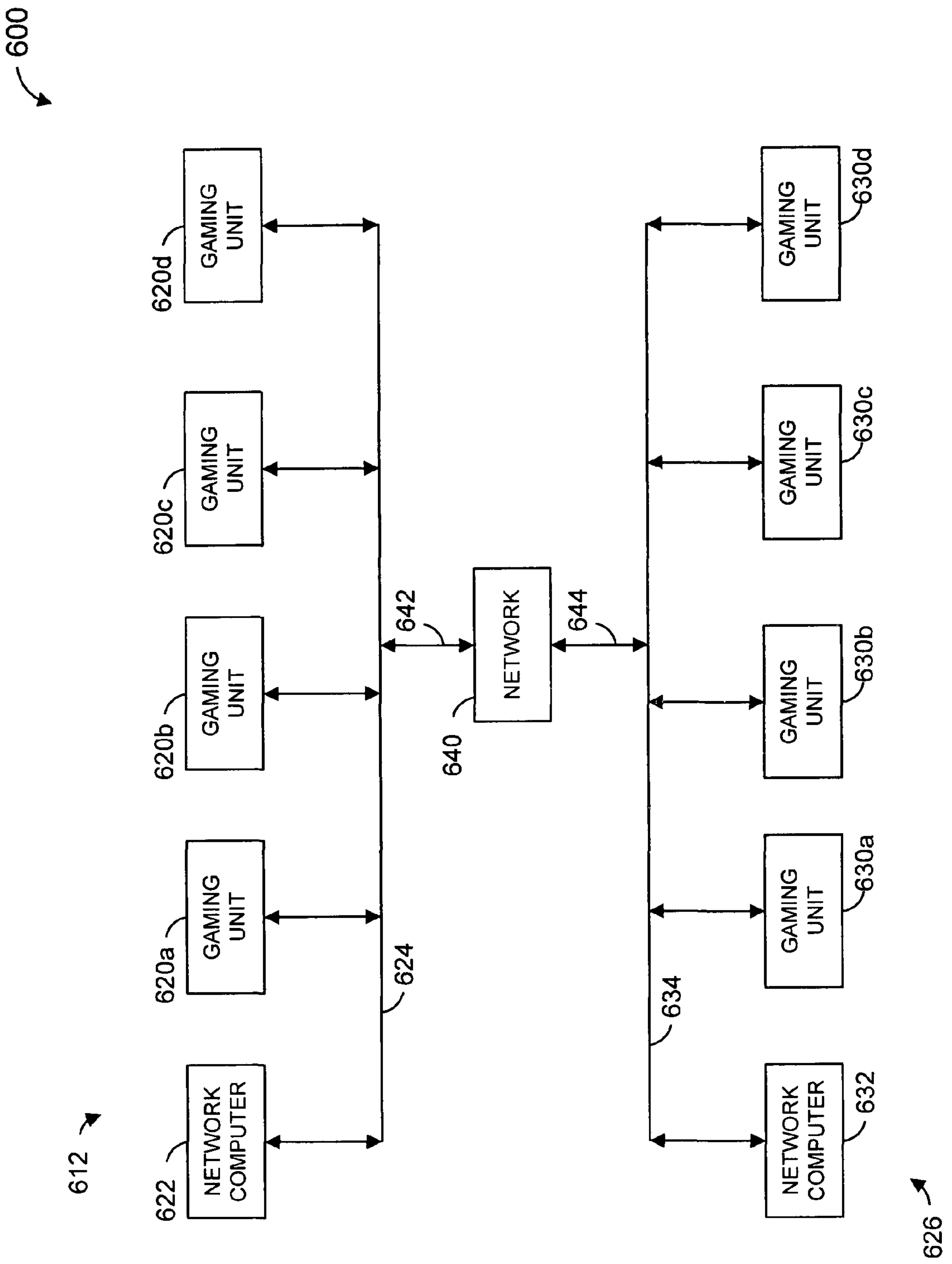
FIG. 11 is a block diagram of an embodiment of a casino game system.

Although the above embodiments were described in the context of a lottery system, embodiments may be implemented via a gaming apparatus as well. FIG. 11 illustrates one possible embodiment of a casino gaming system 600 in accordance with the invention. Referring to FIG. 11, the casino gaming system 600 may include a first group or network 612 of casino gaming units 620 operatively coupled to a network computer 622 via a network data link or bus 624. The casino gaming system 600 may include a second group or network 626 of casino gaming units 630 operatively coupled to a network computer 632 via a network data link or bus 634.

The first and second gaming networks 612, 626 may be operatively coupled to each other via a network 640, which may comprise, for example, the Internet, a WAN, a LAN, an intranet, an extranet, a wireless communication network (e.g., a cellular phone network, a wireless LAN, etc.), etc. The first and second gaming networks 612, 626 may be respectively operatively coupled to the network 640 via a first network link 642 and a second network link 644.

The first network 612 of gaming units 620 may be provided in a first casino, and the second network 626 of gaming units 630 may be provided in a second casino located in a separate geographic location than the first casino. For example, the two casinos may be located in different areas of the same city, or they may be located in different states. The network 640 may include a plurality of network computers or server computers (not shown), each of which may be operatively interconnected. Where the network 640 comprises the Internet, data communication may take place over the communication links 642, 644 via an Internet communication protocol.

The network computer 622 may be a server computer and may be used to accumulate and analyze data relating to the operation of the gaming units 620. For example, the network computer 622 may continuously receive data from each of the gaming units 620 indicative of the dollar amount and number of wagers being made on each of the gaming units 620, data indicative of how much each of the gaming units 620 is paying out in winnings, data regarding the identity and gaming habits of players playing each of the gaming units 620, etc. The network computer 632 may be a server computer and may be used to perform the same or different functions in relation to the gaming units 630 as the network computer 622 described above.

Although each network 612, 626 is shown to include one network computer 622, 632 and four gaming units 620, 630, it should be understood that different numbers of computers and gaming units may be utilized. For example, the network 612 may include a plurality of network computers 622 and tens or hundreds of gaming units 620, all of which may be interconnected via the data link 624. The data link 624 may provided as a dedicated hardwired link or a wireless link. Although the data link 624 is shown as a single data link 624, the data link 624 may comprise multiple data links.

Figure 12:
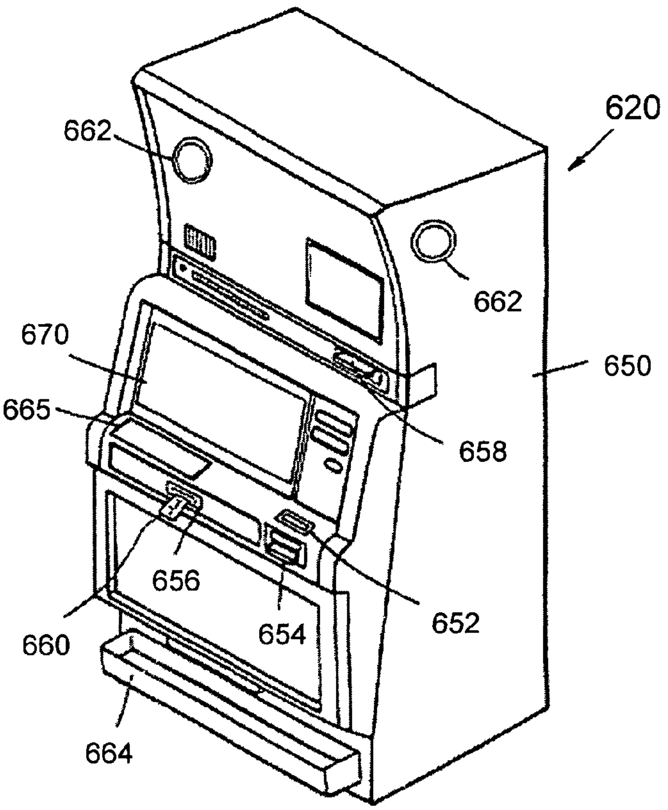
FIG. 12 is a perspective view of an embodiment of one of the gaming units shown schematically in FIG. 11.

FIG. 12 is a perspective view of one possible embodiment of one or more of the gaming units 620. Although the following description addresses the design of the gaming units 620, it should be understood that the gaming units 630 may have the same design as the gaming units 620 described below. It should be understood that the design of one or more of the gaming units 620 may be different than the design of other gaming units 620, and that the design of one or more of the gaming units 630 may be different than the design of other gaming units 630. Each gaming unit 620 may be any type of casino gaming unit and may have various different structures and methods of operation. For exemplary purposes, various designs of the gaming units 620 are described below, but it should be understood that numerous other designs may be utilized.

Referring to FIG. 12, the casino gaming unit 620 may include a housing or cabinet 650 and one or more input devices, which may include a coin slot or acceptor 652, a paper currency acceptor 654, a ticket reader/printer 656 and a card reader and/or writer 658 (hereinafter "card reader/writer 658"), which may be used to input value to the gaming unit 620. A value input device may include any device that can accept value from a customer. As used herein, the term "value" may encompass gaming tokens, coins, paper currency, ticket vouchers, credit or debit cards, and any other object representative of value.

If provided on the gaming unit 620, the ticket reader/printer 656 may be used to read and/or print or otherwise encode ticket vouchers 660. The ticket vouchers 660 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 660 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 660 could be printed with an optically readable material such as ink, or data on the ticket vouchers 660 could be magnetically encoded. The ticket reader/printer 656 may be provided with the ability to both read and print ticket vouchers 660, or it may be provided with the ability to only read or only print or encode ticket vouchers 660. In the latter case, for example, some of the gaming units 620 may have ticket printers 656 that may be used to print ticket vouchers 660, which could then be used by a player in other gaming units 620 that have ticket readers 656.

If provided, the card reader/writer 658 may include any type of card reading device, such as a magnetic card reader or an optical card reader, and may be used to read data from a card offered by a player, such as a credit card or a player tracking card. The card reader/writer 658 may also include any type of card writing device, such as a magnetic card writer or an optical card writer, and may be used to write data to a card offered by a player, such as a credit card or a player tracking card. If provided for player tracking purposes, the card reader/writer 658 may be used to read data from, and/or write data to, player tracking cards that are capable of storing data representing the identity of a player, the identity of a casino, the player's gaming habits, etc.

The gaming unit 620 may include one or more audio speakers 662, a coin payout tray 664, an input control panel 665 and a display unit 670 for displaying display data relating to the game or games provided by the gaming unit 620. The audio speakers 662 may generate audio representing sounds such as the noise of spinning slot machine reels, a dealer's voice, music, announcements or any other audio related to a casino game. The input control panel 665 may be provided with a plurality of pushbuttons or touch-sensitive areas that may be pressed by a player to select games, make wagers, make gaming decisions, etc. The display unit 670 may include one or more two dimensional display units such as a color video display unit displaying images. Additionally, the display unit 670 may include one or more three dimensional display units such as mechanical reels, a holographic display, a stereoscopic display, a three-dimensional display volume, etc.

Figure 12A:
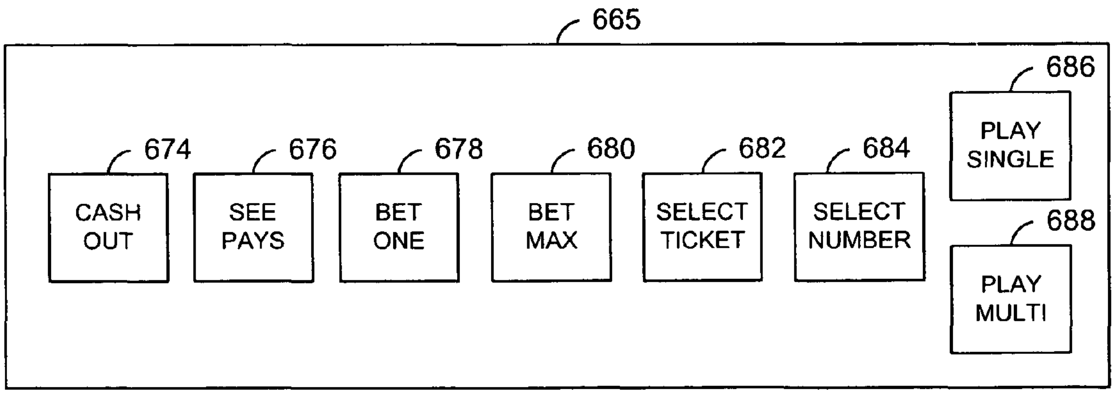
FIG. 12A is a block diagram of an embodiment of a control panel of the gaming unit of FIG. 12.

FIG. 12A illustrates one possible embodiment of the control panel 665, which may be used where the gaming unit 620 is configured for playing keno. Referring to FIG. 12A, the control panel 665 may include a "Cash Out" button 674, a "See Pays" button 676, a "Bet One Credit" button 678, a "Bet Max Credits" button 680, a "Select Ticket" button 682, a "Select Number" button 684, a "Single Play" button 686, and a "Multi Play" button 688.

In FIG. 12A, a rectangle is shown around the buttons 674, 676, 678, 680, 682, 684, 686, and 688. It should be understood that that rectangle simply designates, for ease of reference, an area in which the buttons 674, 676, 678, 680, 682, 684, 686, and 688 may be located. Consequently, the term "control panel" should not be construed to imply that a panel or plate separate from the housing 650 of the gaming unit 620 is required, and the term "control panel" may encompass a plurality or grouping of player activatable buttons.

Although one possible control panel 665 is described above, it should be understood that different buttons could be utilized in the control panel 665, and that the particular buttons used may depend on the game or games that could be played on the gaming unit 620. Although the control panel 665 is shown to be separate from the display unit 670, it should be understood that the control panel 665 could be generated by the display unit 670. In that case, each of the buttons of the control panel 665 could be a colored area generated by the display unit 670, and some type of mechanism may be associated with the display unit 670 to detect when each of the buttons was touched, such as a touch-sensitive screen.

Figure 13:
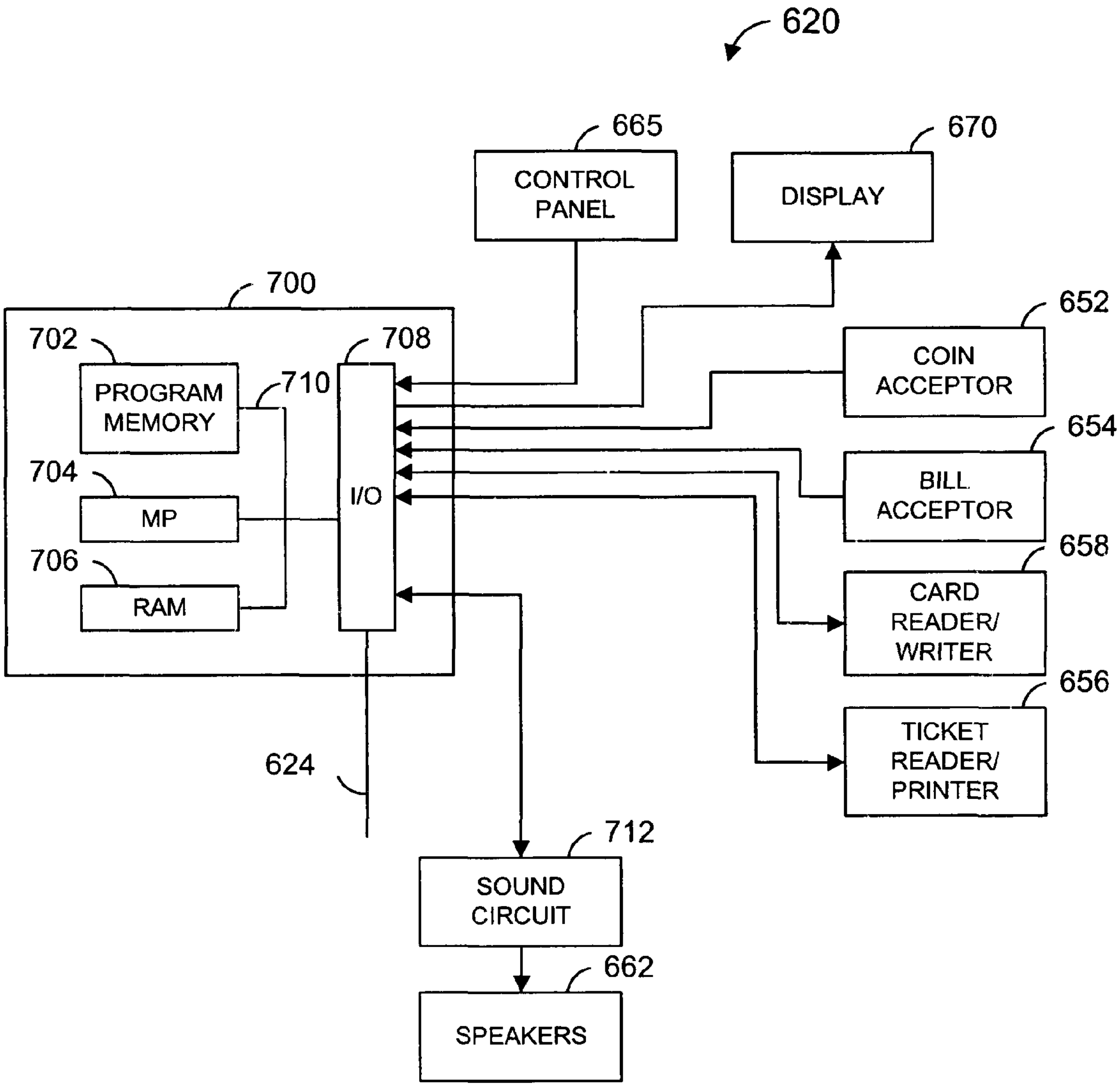
FIG. 13 is a block diagram of electronic components of the gaming unit of FIG. 12.

FIG. 13 is a block diagram of a number of components that may be incorporated in the gaming unit 620. Referring to FIG. 13, the gaming unit 620 may include a main controller 700 that may comprise a program memory 702, a microcontroller or microprocessor (MP) 704, a RAM 706, and an I/O circuit 708, all of which may be interconnected via an address/data bus 710. It should be appreciated that although only one microprocessor 704 is shown, the main controller 700 may include multiple microprocessors 704. Similarly, the memory of the main controller 700 may include multiple RAMs 706 and multiple program memories 702. Although the I/O circuit 708 is shown as a single block, it should be appreciated that the I/O circuit 708 may include a number of different types of I/O circuits. The RAM(s) 704 and program memory (or memories) 702 may be implemented as semiconductor memories, magnetically readable memories, and/or optically readable memories, for example.

The program memory 702 may comprise a ROM, a read/write or alterable memory, such as a hard disk, a flash memory, an EPROM, an EEPROM, etc. In the event a hard disk is used as a program memory, the address/data bus 710 shown schematically in FIG. 13 may comprise multiple address/data buses, which may be of different types, and there may be an I/O circuit disposed between the address/data buses.

FIG. 13 illustrates that the control panel 665, the coin acceptor 652, the bill acceptor 654, the card reader 658, the ticket reader/printer 656 and the display unit 670 may be operatively coupled to the I/O circuit 708, each of those components being so coupled by either a unidirectional or bidirectional, single-line or multiple-line data link, which may depend on the design of the component that is used. The links may each comprise a serial communication link and/or a parallel communication link. The speaker(s) 662 may be operatively coupled to a sound circuit 712, that may comprise a voice- and sound-synthesis circuit or that may comprise a driver circuit. The sound-generating circuit 712 may be coupled to the I/O circuit 708.

As shown in FIG. 13, the components 652, 654, 656, 658, 665, 670, and 712 may be connected to the I/O circuit 708 via one or more respective direct lines or conductors. Different connection schemes could be used. For example, one or more of the components shown in FIG. 13 may be connected to the I/O circuit 708 via a common bus or other data link that is shared by a number of components. Furthermore, some of the components may be directly connected to the microprocessor 104 without passing through the I/O circuit 708.

One manner in which one or more of the gaming units 620 (and one or more of the gaming units 630) may operate is described below in connection with a flowchart which represent a number of portions or routines of one or more computer programs, which may be stored in one or more of the memories of the main controller 700. The computer program(s) or portions thereof may be stored remotely, outside of the gaming unit 620, and may control the operation of the gaming unit 620 from a remote location. Such remote control may be facilitated with the use of a wireless connection, or by an Internet interface that connects the gaming unit 620 with a remote computer (such as one of the network computers 622, 632) having a memory in which the computer program portions are stored. The computer program portions may be written in any high level language such as C, C+, C++ or the like or any low-level, assembly or machine language. By storing the computer program portions therein, various portions of the memory or memories 702, 706 of the main controller 700 are physically and/or structurally configured in accordance with computer program instructions.

Figure 14:
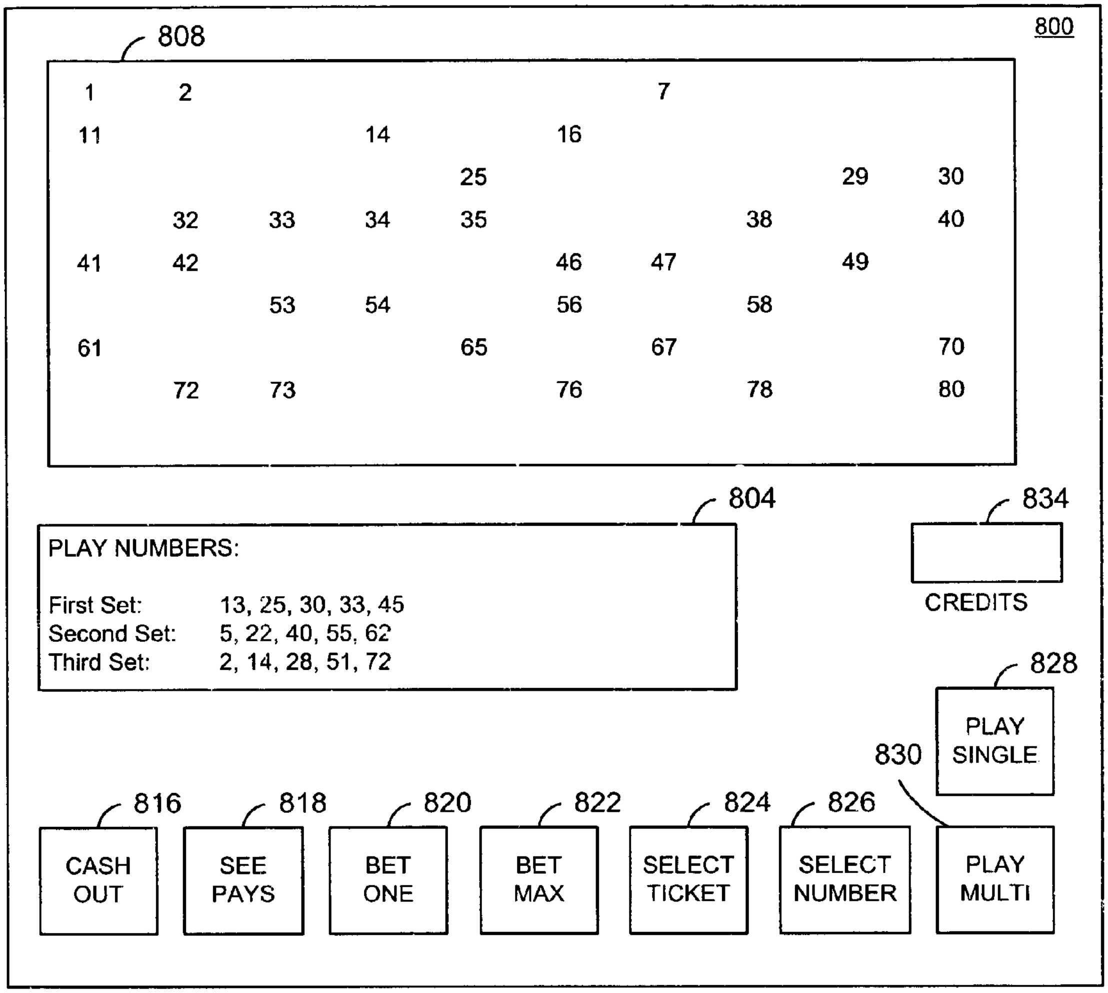
FIG. 14 is an illustration of an example of a visual display that may be displayed during performance of a keno routine.
Figure 15:
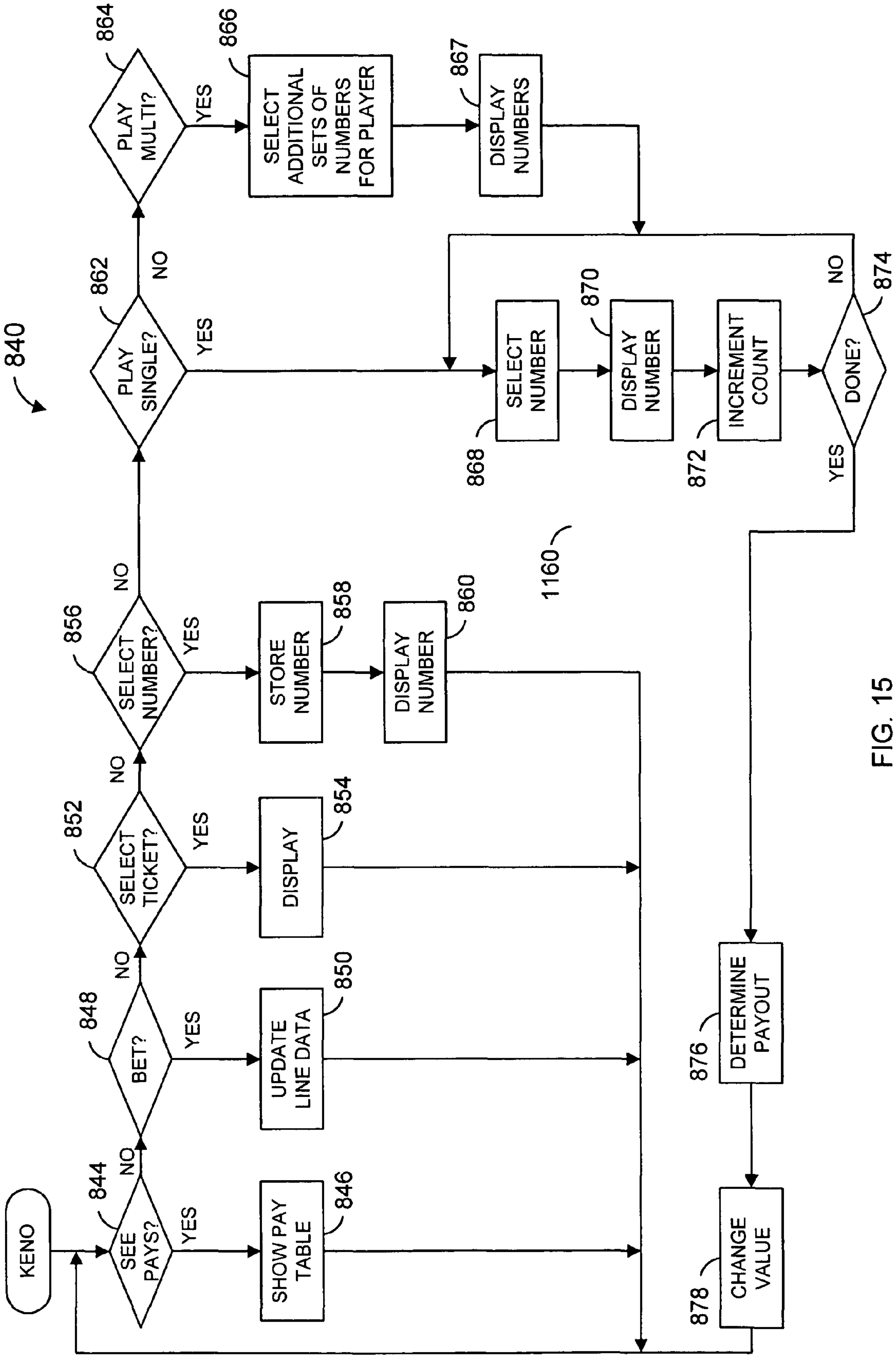
FIG. 15 is a flowchart of an example keno routine.

FIG. 14 is an exemplary display 800 that may be shown on the display unit 670 during performance of a video keno routine 840 shown schematically in FIG. 15. Referring to FIG. 14, the display 800 may include a video image 804 of a plurality of numbers that were selected for and/or by the player prior to the start of a keno game and a video image 808 of a plurality of numbers randomly or pseudo-randomly selected during the keno game. The randomly selected numbers may be displayed in a grid pattern.

To allow the player to control the play of the keno game, a plurality of player-selectable buttons may be displayed. The buttons may include a “Cash Out” button 816, a “See Pays” button 818, a “Bet One Credit” button 820, a “Bet Max Credits” button 822, a “Select Ticket” button 824, a “Select Number” button 826, and a “Single Play” button 828, and a “Multi Play” button 830. The display 800 may also include an area 834 in which the number of remaining credits or value is displayed. If the display unit 670 is provided with a touch-sensitive screen, the buttons may form part of the video display 800. Alternatively, one or more of those buttons may be provided as part of a control panel that is provided separately from the display unit 670.

FIG. 15 is a flowchart of the video keno routine 840. The keno routine 840 may be utilized in connection with a single gaming unit 620 where a single player is playing a keno game, or the keno routine 840 may be utilized in connection with multiple gaming units 620 where multiple players are playing a single keno game. In the latter case, one or more of the acts described below may be performed either by the main controller 700 in each gaming unit or by one of the network computer 622, 632 to which multiple gaming units 620, 630 are operatively connected.

Referring to FIG. 15, at block 844, the routine may determine whether the player has requested payout information, such as by activating the “See Pays” button 818, in which case at block 846 the routine may cause one or more pay tables to be displayed on the display unit 670. At block 848, the routine may determine whether the player has made a bet, such as by having pressed the “Bet One Credit” button 820 or the “Bet Max Credits” button 822, in which case at block 850 bet data corresponding to the bet made by the player may be stored in the memory of the main controller 700. After the player has made a wager, at block 852 the player may select a keno ticket, and at block 854 the ticket may be displayed on the display 800. At block 856, the player may select one or more game numbers, which may be within a range set by the casino. After being selected, the player’s game numbers may be stored in the memory of the main controller 700 at block 858 and may be included in the image 804 on the display 800 at block 860. After a certain amount of time, the keno game may be closed to additional players (where a number of players are playing a single keno game using multiple gambling units 620).

If the player wishes to play a single set of numbers (block 862) and if the keno game is to begin, the flow of the routine may proceed to block 868. If the player wishes to play a multiple set of numbers (block 864), the flow of the method may proceed to block 866. At block 866, additional sets of numbers may be selected for the player. For example, additional sets of numbers may be pseudo-randomly selected by the controller 700, the network computer 622, etc. In other embodiments, the player may be allowed to select how many additional sets of numbers are to be selected. In still other embodiments, the player may be allowed to select the numbers in the additional sets. At block 867, the additional sets of numbers may be displayed in the image 804 on the display 800.

At block 868, a game number within a range set by the casino may be randomly selected either by the main controller 700 or a central computer operatively connected to the controller, such as one of the network computers 622, 632. Additionally, the number may be randomly selected in a drawing, and then entered into a computer (e.g., network computer 622, 632, or some other computer). At block 870, the randomly selected game number may be displayed on the display unit 670 and the display units 670 of other gaming units 620 (if any) which are involved in the same keno game. At block 872, the main controller 700 (or the central computer noted-above) may increment a count which keeps track of how many game numbers have been selected at block 870.

At block 874, the main controller 700 (or one of the network computers 622, 632) may determine whether a maximum number of game numbers within the range have been randomly selected. If not, another game number may be randomly or pseudo-randomly selected at block 868. If the maximum number of game numbers has been selected, at block 876 the main controller 700 (or a central computer) may determine a payout associated with the numbers selected at blocks 856 and 866. The payout may be determined as described previously or in a similar manner.

At block 878, the player's cumulative value or number of credits may be updated by subtracting the bet made by the player and adding, if the keno game was won, the payout value determined at block 876. The cumulative value or number of credits may also be displayed in the display area 834 (FIG. 14).

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a read-only memory (ROM), etc. Further, although the examples described above were described with reference to various flow diagrams, one of ordinary skill in the art will appreciate that many other methods may alternatively be used. For example, the order of execution of the blocks may be changed, and/or some or all of the blocks may be changed, eliminated, or combined.

What is claimed is:

1. A gaming server, comprising:

a controller operatively coupled to a network, the controller comprising a microprocessor and a memory operatively coupled to the microprocessor, the controller configured to receive player symbol data via the network, the player symbol data indicative of a plurality of sets of player symbols associated with a player for a single play of a game, wherein each player symbol is selected from a plurality of possible symbols;

the controller configured to receive, via the network, an indication that the player has submitted a wager for a plurality of sets of player symbols in a single play;

the controller configured to receive winning symbol data indicative of a set of winning symbols from the plurality of possible symbols;

the controller configured to determine a value payout based on respective numbers of winning symbols in respective sets of player symbols wherein winning symbols throughout the plurality of sets of player symbols in a single play of the game cooperate to determine the payout for the single play of the game wherein the payout is determined by a distribution and number of the symbols throughout the plurality of sets independent of a particular orientation of the symbols with respect to one another, wherein for at least some value payouts the value payout for winning a plurality of sets on the single play is different than a sum of a plurality of individual value payouts for winning each set individually, each individual payout based on the respective number of winning symbols in the corresponding set of player symbols; and the controller configured to transmit, via the network, player payout data indicative of the value payout.

2. A gaming server as defined in claim 1, wherein the controller is configured to receive the player selected symbol data from a lottery terminal operatively coupled to the network.

3. A gaming server as defined in claim 1, wherein the controller is configured to receive the player symbol data from a personal computing device operatively coupled to the network.

4. A gaming server as defined in claim 1, wherein the controller is configured to receive the indication that the player has submitted the wager from a lottery terminal operatively coupled to the network.

5. A gaming server as defined in claim 1, wherein the controller is configured to receive the indication that the player has submitted the wager from a personal computing device operatively coupled to the network.

6. A gaming apparatus, comprising:

a value input device;

a controller operatively coupled to a network and to the value input device, the controller comprising a microprocessor and a memory operatively coupled to the microprocessor, the controller configured to determine a wager for a plurality of sets of player symbols in a single play of a game has been received from a player via the value input device;

the controller configured to determine a plurality of sets of player symbols associated with the player for a single play, wherein each player symbol is selected from a plurality of possible symbols;

the controller configured to determine a value payout based on respective numbers of winning symbols in respective sets of player symbols, wherein the winning symbols are from a set of winning symbols from the plurality of possible symbols, wherein winning symbols throughout the plurality of sets of player symbols in a single play of the game cooperate to determine the payout for the single play of the game, wherein the payout is determined by a distribution and number of the symbols throughout the plurality of sets independent of a particular orientation of the symbols with respect to one another, wherein for at least some value payouts the value payout for winning a plurality of sets on the single play is different than a sum of a plurality of individual value payouts for winning each set individually, each individual payout based on the respective number of winning symbols in the corresponding set of player symbols; and the controller configured to provide the value payout, if any, to the player.

* * * * *